July 19, 1955 R. C. KEEN 2,713,321
SELF-SIFTING DUST BATH PAN
Filed Feb. 3, 1953 2 Sheets-Sheet 1
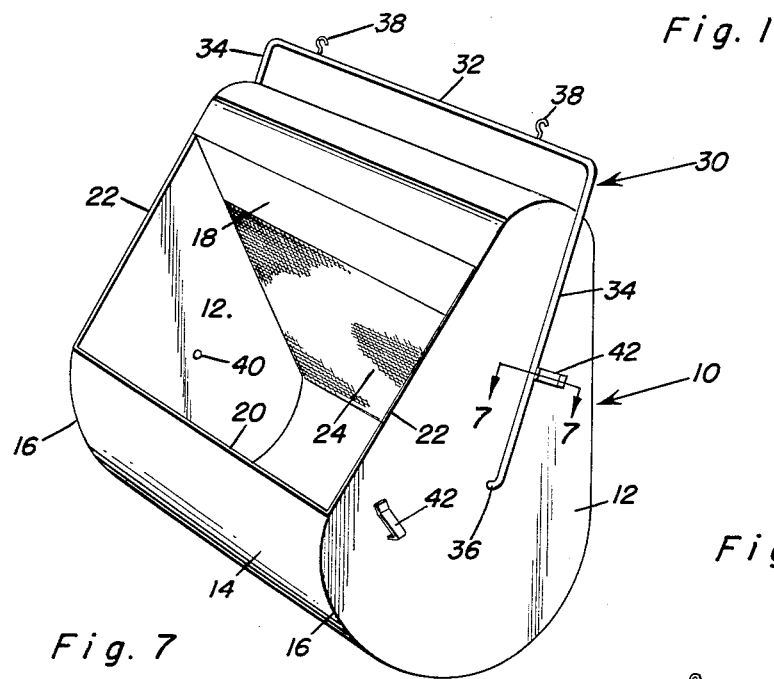
Fig. 1
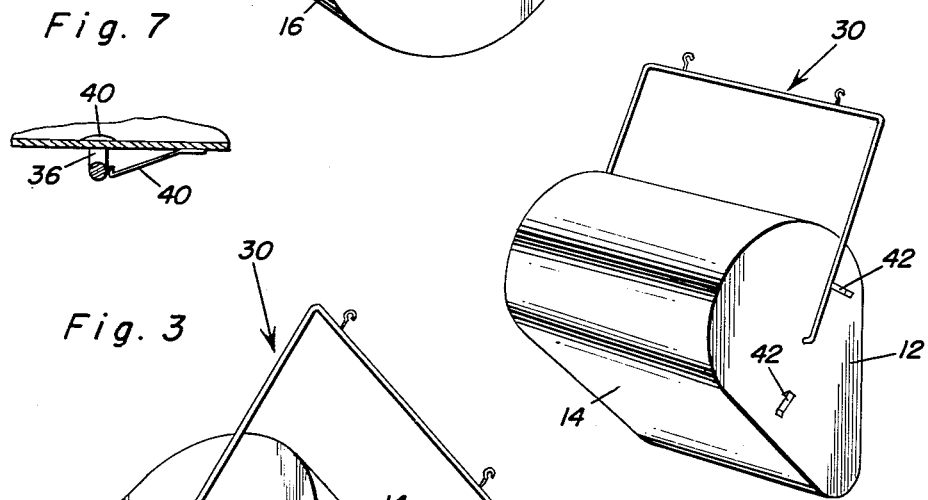
Fig. 2
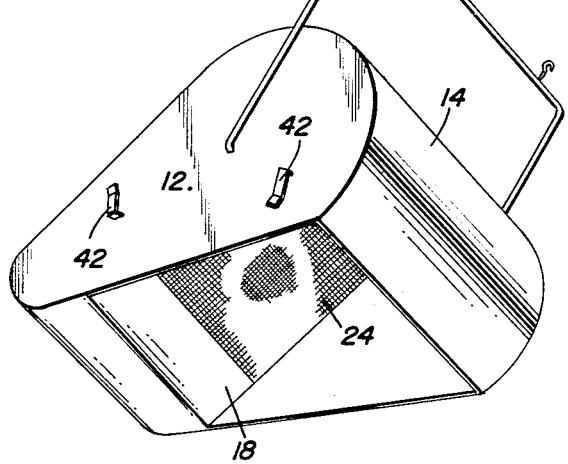
Fig. 7
Fig. 3
Richard C. Keen
INVENTOR.
BY *Clarence A. O'Brien*
*and Harvey B. Jacobson*
Attorneys July 19, 1955  R. C. KEEN  2,713,321
SELF-SIFTING DUST BATH PAN
Filed Feb. 3, 1953  2 Sheets-Sheet 2
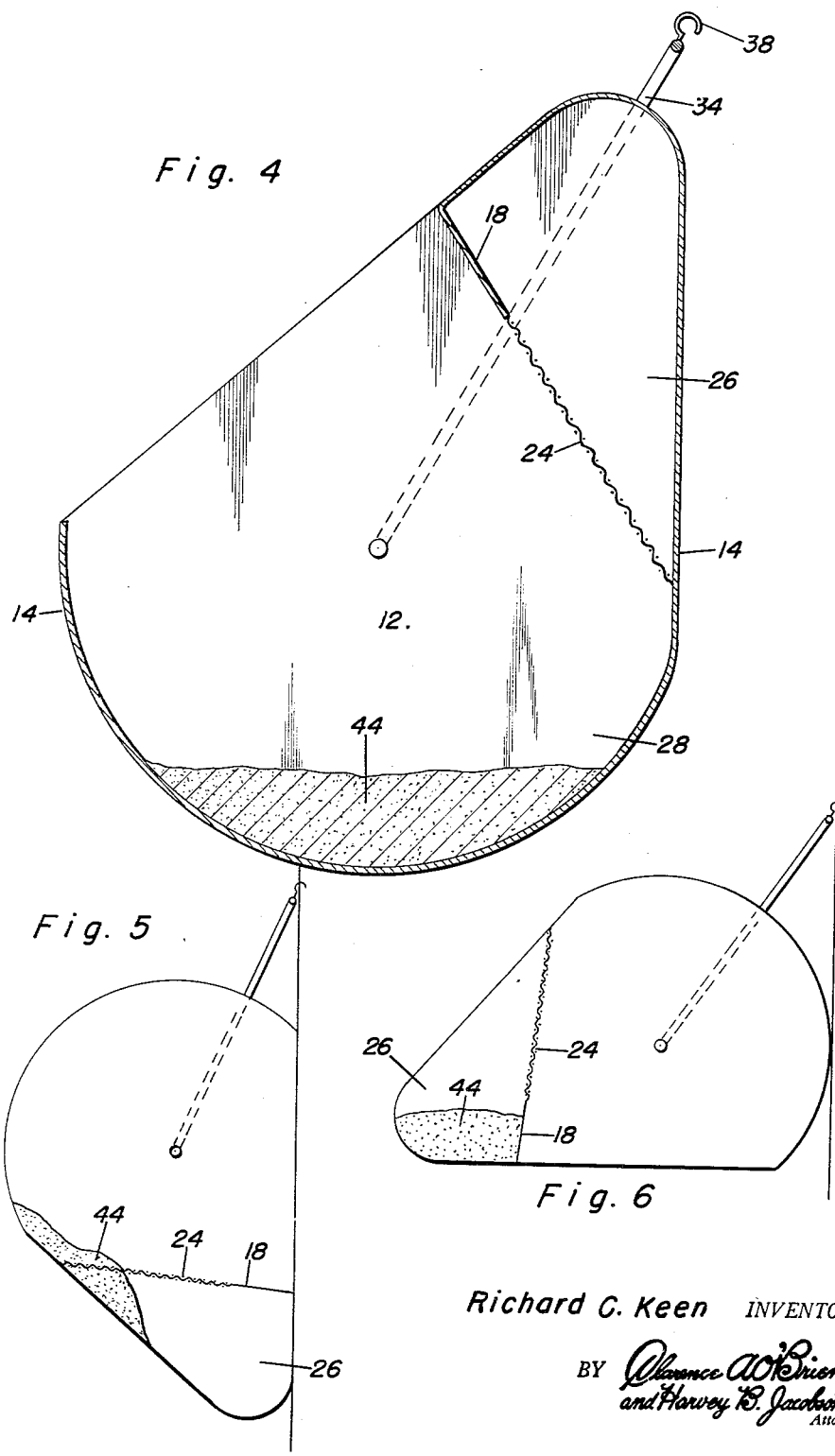
Richard C. Keen INVENTOR.

United States Patent Office 2,713,321
Patented July 19, 1955

2,713,321

SELF-SIFTING DUST BATH PAN

Richard C. Keen, Medford, Oreg.

Application February 3, 1953, Serial No. 334,802

8 Claims. (Cl. 119—1)

This invention relates to animal husbandry, and more particularly to a device for administering dust to an animal.

An object of this invention is to provide a pan for use by animals, especially of the furred type, wherein they may roll or otherwise manipulate themselves so as to absorb special dust disposed within the pan in their fur.

Another object of this invention is to provide a pan which incorporates a partially porous partition dividing the pan into a bathing portion and a reservoir portion wherein the pan when rotatably mounted on the walled interior of an animal enclosure may be rotated to sift dust flowing between the reservoir and the bath portions through the porous partition.

Another object of this invention is to provide a pan for dusting furred animals which incorporates means for rotatably mounting the pan wherein it can be rotated in one direction only to effect a series of beneficial and desirable operations.

Another object of this invention is to provide a pan for dusting animals which is rotatably mounted and provided with a porous partition wherein dusting of the animal, sifting of the dust, dumping foreign material from the pan and resifting of the dust may be successively performed in response to rotation of the pan.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

Figure 1 is a perspective view of the self-sifting dust bath pan and showing the same in animal dusting position;

Figure 2 is a perspective view of the pan on a diminished scale and showing a position of the pan wherein the dust is disposed within the reservoir thereof;

Figure 3 is another perspective view of the pan disposed in dumping relation;

Figure 4 is a vertical elevation taken through the pan shown in the position of Figure 1 and showing details of its internal construction;

Figure 5 is a diagrammatic view of the pan disposed in the position shown in Figure 2;

Figure 6 is another diagrammatic view but showing the pan disposed in the position shown in Figure 3; and Figure 7 is an enlarged section taken substantially along the plane of section line 7—7 of Figure 1 and showing details of the ratchet clips.

Referring now more particularly to Figure 1, reference numeral 10 indicates generally the self-sifting dust bath pan which includes a pair of spaced parallel side walls 12 and a sheet of material 14 secured, as at 16, along its opposite longitudinal edges to the side walls and extending peripherally thereof in bounding relation. One end portion 18 of the sheet is bent or deformed inwardly to form a portion of a partition, and the opposite end 20 is spaced therefrom along the flat edges 22 of the side walls 12 to define an opening therebetween.

Referring now more particularly to Figure 4, it will be seen that a screen 24 or other foraminous material is provided coextensive with the sheet portion 18 and cooperates therewith to present a partition dividing the pan into an upper reservoir portion 26 and a lower bathing portion 28.

In order to rotatably mount the pan about a horizontal axis when the assembly is mounted on an interior wall of an animal enclosure, a bail or handle 30 is provided. The bail is generally U-shaped and includes a bight portion 32 and opposed depending legs 34 which are provided with inturned ends 36 which project through and are pivotally received in the side walls 12. A pair of hooks 38 may be provided on the bight portion for ease of securement to a wall, and the free ends of inturned portions 36 may be headed or upset, as indicated by numeral 40 in Figure 7.

A pair of resilient L-shaped clips 42 are secured at spaced points on the side walls 12 and, as clearly shown in Figure 7, each of the clips is disposed in the path of movement of the bail legs 34 so that the pan may be rotated in one direction only from an upright bathing position about the inturned ends of the bail. The purpose of this construction will be presently apparent.

In operation, the pan is provided with a quantity of special dust 44 which is of special chemical composition so as to be beneficial to the growth and development of fur in certain of the fur bearing animals, such as mink, chinchillas or the like. The assembly is normally positioned in upright bathing position, as is shown in Figures 1 and 4, so that the animal will have access into the bathing portion 28 thereof where he may roll in the dust or otherwise manipulate himself to cover his fur with dust and receive the beneficial effects thereof. In this respect, it may be pointed out that the animals derive much pleasure from rolling and burrowing in the dust and need no special inducement to enter the dusting pan.

It is of paramount importance in the raising of certain of the fur bearing animals, such as those described above, that the chemical dust be maintained in fine texture and free of foreign material so that the animal may eagerly enter the dusting pan and derive the maximum of benefit from the chemical dust therein. Therefore, it is necessary that the chemical dust be periodically sifted so that it may remain clean and free from impurities, and this is accomplished by periodically rotating the pan about its pivot clockwise, as viewed in Figures 1, 2, 4, 5, into the inverted position shown in Figures 2 and 5, wherein the chemical dust 44 will flow or fall downwardly through the screen 24 and into the reservoir portion 26 whereupon any foreign material will be left outside of the reservoir portion on top of the screen 24. Thereafter, the pan may be rotated clockwise into the intermediate position shown in Figures 3 and 6, wherein the dust 44 will be maintained in the reservoir 26 by means of the partition portion 18 and any foreign material remaining in the bathing portion will be dumped therefrom outwardly of the opening in the pan. The pan may then be rotated clockwise back to the upright bathing position, Figures 1 and 4, wherein the dust will once again flow through the screen 24 and be re-sifted whereupon it will fall into the bottom of the bathing portion 28 in a clean and fine textured condition so that the animal may once again roll and burrow therein to derive the maximum of benefit from the chemical dust.

The previously mentioned ratchet clips 42 are so disposed as to permit rotation in a clockwise direction only of the pan from upright bathing position so that all of the above described operations must be performed once the pan has been moved from the initial position, thereby effecting the most desirable condition of the dust at all times. Also, the clips function to prevent counterclockwise rotation of the pan in either one of two positions in which it will most normally be disposed, that is, the upright bathing position, as shown in Figure 1, and the inverted storage position, as shown in Figure 2. The point of pivotal attachment of the bail 30 to the side walls is such and the clips 42 are so arranged that said clips wipe under the legs 36 during rotation of the pan clockwise from upright bathing position into inverted position and snap behind said legs in said positions to block rotation of the pan counterclockwise.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A dust bath comprising a pan adapted to contain dust and having spaced side walls, a sheet of material having opposite longitudinal edges secured to said side walls and disposed therearound in partial bounding relation, said sheet terminating at spaced points on said side walls defining an opening therebetween, said sheet having one end deformed inwardly and a screen coextensive with the end presenting therewith a partition within the pan, means for rotatably mounting the pan on a wall about an axis extending between the side walls, whereby the dust will be sifted through said screen to pass from one side to the other of said pan in response to rotation of said pan about said axis.

2. A dust bath comprising a pan adapted to contain dust and having spaced side walls, a sheet of material having opposite longitudinal edges secured to said side walls and disposed therearound in partial bounding relation, said sheet terminating at spaced points on said side walls defining an opening therebetween, said sheet having one end deformed inwardly and a screen coextensive with the end presenting therewith a partition within the pan, means for rotatably mounting the pan on a wall about an axis extending between the side walls, whereby the dust will be sifted through said screen to pass from one side to the other of said pan in response to rotation of said pan about said axis, said means comprising a substantially U-shaped bail having inturned end portions received through the side walls and having its bight portion provided with hooks for attachment to a wall.

References Cited in the file of this patent

UNITED STATES PATENTS

| 1,836,488 | Munson | Dec. 15, 1931 |
| 1,891,042 | Benoit | Dec. 13, 1932 |
| 2,195,575 | Mallgraf | Apr. 2, 1940 |